Sept. 12, 1939.   J. W. VINCENT   2,173,028
AUTOMATIC BRAKE ADJUSTER
Filed Aug. 8, 1938
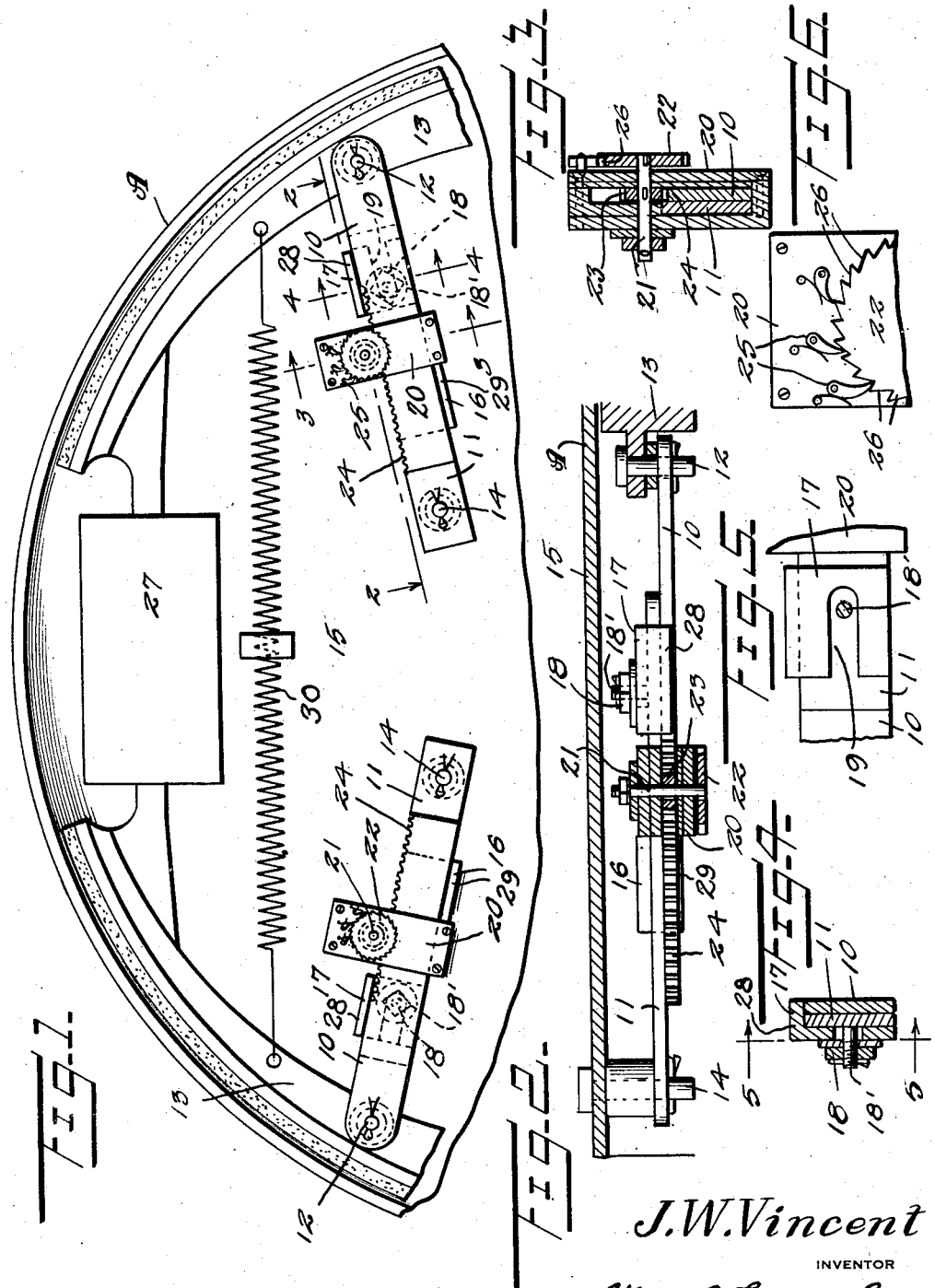
J.W.Vincent
INVENTOR Patented Sept. 12, 1939

2,173,028

UNITED STATES PATENT OFFICE 2,173,028

AUTOMATIC BRAKE ADJUSTER

Jesse Walter Vincent, Port Arthur, Tex.

Application August 8, 1938, Serial No. 223,757

3 Claims. (Cl. 188—79.5)

The invention relates to a brake and more especially to an automatic brake adjuster or regulator for hydraulic brakes.

The primary object of the invention is the provision of an adjuster or regulator of this character, wherein the same in its use with hydraulic brakes of motor vehicles will enable the assurance of braking efficiency at all times, and, additionally, maintaining a constant clearance between the brake shoe and the band, the adjuster being automatic in its action so that it requires no attention and will be positive in the working thereof.

Another object of the invention is the provision of an adjuster or regulator of this character, wherein the adjustment takes place under self action of the said adjuster as the brake bands wear.

A further object of the invention is the provision of an adjuster or regulator of this character, wherein in the working thereof it will automatically keep the shoes the proper distance from the brake drum and this automatic action takes place when the brake lining wears on one side of the brake greater than on the other side and the brakes may be adjusted very close or otherwise to suit the requirements of different operators of a motor vehicle.

A still further object of the invention is the provision of an adjuster or regulator of this character, which is simple in its construction, thoroughly reliable and efficient in operation, possessing but few parts yet strong, durable, automatically acting and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary elevation looking toward the inner side of a brake structure showing the automatic brake adjuster or regulator constructed in accordance with the invention applied.

Fig. 2 is a sectional view taken on the line 2—2 of Figure 1 looking in the direction of the arrows.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a fragmentary detail sectional view taken on the line 5—5 of Figure 4.

Figure 6 is an enlarged fragmentary elevation showing the rack and pinion adjuncts.

Similar reference characters indicate corresponding parts throughout the several views in the drawing.

Referring to the drawing in detail, A designates generally a portion of a brake mechanism of the hydraulic type for motor vehicles and associated with this mechanism is the automatic adjuster or regulator constituting the present invention, being two employed and a description of one will suffice for the other as hereinafter set forth.

Each unit of the brake adjuster or regulator comprises relatively slidable members 10 and 11, respectively, these being disposed in overlapped relation to each other and the outer end of the member 10 has swingable connection at 12 with a brake shoe 13 while the member 11 at its outer end has swingable connection at 14 with the brake housing, being fitted with the wall part 15 of said housing.

The member 11 has integral or permanently fitted thereto a striker 16 while spaced from this striker and on said member 11 is an adjustable striker 17, being adjustable by means of a nut 18 threaded on a stud 18' on the member 11. The striker 17 is formed with an elongated slot 19 which opens through one end thereof and this slot accommodates the stud 18' carrying the nut 18.

Loosely disposed about the members 10 and 11 between the strikers 16 and 17, respectively, is a yoke-like carrier 20 forming a movable abutment having an arbor 21 journaled therein to which is fixed a ratchet wheel 22 and a rack pinion 23, respectively. The rack pinion 23 meshes with a toothed rack formation 24 on the member 10 at the upper longer edge thereof. Fitted to the carrier 20 is a series of spring-pressed pawls or dogs 25, one being completely sunk with relation to the depth of one of the teeth 26 of the ratchet wheel 22 while another of these pawls or dogs is partially sunk with relation to another of the teeth 26 and the remaining pawl or dog is riding over a tooth of such wheel.

The striker 17, by adjustment thereof, allows the proper clearance between it and the striker 16 for the displacement of the carrier 20.

The brake mechanism involves the two shoes 13, these being swingable, as is conventional, and coact with the customary cylinder 21 of the usual hydraulic brake system.

The carrier 20 can be slid in one direction only on the member 10 in that the pawls or dogs 25 let the ratchet wheel 22 turn only in one direction, the pinion 23 being in meshing engagement with the rack teeth 24 and this pinion 23 is fixed to the shaft 21 having the ratchet wheel 22 also fixed thereto, so when a brake lining wears, each application of the shoe 13 will move the member 10 therewith, and when the carrier 20 engages with the striker 17, the member 10 is not interrupted in the throw thereof as the said carrier 20 will be sustained against following the member 10 in its movement so that the shoe 13 can make contact with the drum and this extended movement of said member 10 takes up wear previously had on the shoe. The carrier on reverse movement of the member 10 upon the release of the brake will make contact with the striker 16 and being locked upon said member 10 the latter will be held in an adjusted extended position according to the previous throw of such member with relation to the member 11 and in this fashion the brake shoe 13 will be held in the right place. The striker 17 can be set to give any desired effect with respect to the extension of the member 10 with relation to the member 11 when the brake shoe has been moved to braking position. Now by spacing the striker 17 farther away from the carrier 20 in its adjusted position on the member 10, the brakes will be completely adjusted loose or by putting the striker 17 very close to the carrier 20 it will keep the brakes adjusted very close with respect to the drum and in this way satisfying an operator as to the set of the brakes.

The automatic adjuster or regulator will automatically keep the shoes the proper distance from the brake drum, and when one lining wears more than the other, this will also be taken care of by such adjuster.

The multiple dogs or pawls 25 assure proper ratchet action with the wheel 22 so that the latter will latch when it is turned very slightly.

The striker 17 as well as the striker 16 is provided with flanges 28 and 29, respectively, these being at right angles thereto and lie reversely in overhanging relation to the member 10 so that it will be held in alignment with the member 11 in their side by side relationship to each other and on relative movement of one with respect to the other. The brake shoes 13 have connected therewith the compensating spring 30 for urging said shoes away from the drum, this being conventional.

From the foregoing it can be seen that as the brake lining of the shoe 13 wears, each application of the shoe will move the member 10 or extend the same relative to the member 11 and this extended condition of such member 10 is maintained by the carrier 20 when the said member 10 is thrown in the direction of the member 11 as the said carrier 20 makes contact with the striker 17 limiting this inward throw of said member while the outward throw of the member 10 is not interfered with by the carrier 20 and thus the wear on the brake shoe will be compensated for through the outward movement of the member 10, the latter being susceptible of movement to take up the extent of clearance created by the wear upon said shoe and this being had on each application of the brake. In other words, the adjuster or regulator, which under normal operating conditions of the brake is not operative and which, when the brake shoes become worn so that a normal condition is not present, will automatically adjust the shoes to compensate for the wear of the brake shoe lining and restore the brake in its operations to normal condition. Additionally, the brakes are susceptible of adjustment very close and in this manner satisfying a most exacting operator in a required setting of such brakes.

What is claimed is:

1. An adjuster for a brake having a brake housing, brake drum and brake shoe, comprising a pair of members arranged side by side and movable relative to each other, one of said members being pivoted to the housing and the other member pivoted to the shoe, a toothed rack formed on one of the members, a carrier loosely embracing both members, ratchet mechanism on the carrier and coacting with the toothed rack on one member, a striker on one member and fixed at one side of said carrier, and a striker adjustably held on the member carrying the first-mentioned striker and at the opposite side of the carrier.

2. An adjuster for a brake having a brake housing, brake drum and brake shoe, comprising a pair of members arranged side by side and movable relative to each other, one of said members being pivoted to the housing and the other member pivoted to the shoe, a toothed rack formed on one of the members, a carrier loosely embracing both members, ratchet mechanism on the carrier and coacting with the toothed rack on one member, a striker on one member and fixed at one side of said carrier, and a striker adjustably held on the member carrying the first-mentioned striker and at the opposite side of the carrier, said mechanism including a ratchet wheel and a plurality of ratchet dogs cooperating therewith.

3. An adjuster for a brake having a brake housing, brake drum and brake shoe, comprising a pair of members arranged side by side and movable relative to each other, one of said members being pivoted to the housing and the other member pivoted to the shoe, a toothed rack formed on one of the members, a carrier loosely embracing both members, ratchet mechanism on the carrier and coacting with the toothed rack on one member, a striker on one member and fixed at one side of said carrier, a striker adjustably held on the member carrying the first-mentioned striker and at the opposite side of the carrier, said mechanism including a ratchet wheel and a plurality of ratchet dogs cooperating therewith, and means on each of the strikers for maintaining the members in aligned relation to each other.

JESSE W. VINCENT.